United States Patent

Neumann

[11] Patent Number: 6,155,757
[45] Date of Patent: Dec. 5, 2000

[54] DEBURRING METHOD

[75] Inventor: Karl-Erik Neumann, Gräddö, Sweden

[73] Assignee: Neos Robotics AB, Sweden

[21] Appl. No.: 09/214,734

[22] PCT Filed: Jul. 7, 1997

[86] PCT No.: PCT/SE97/01240

§ 371 Date: Jan. 11, 1999

§ 102(e) Date: Jan. 11, 1999

[87] PCT Pub. No.: WO98/02717

PCT Pub. Date: Jan. 22, 1998

[30] Foreign Application Priority Data

Jul. 11, 1996 [SE] Sweden ................. 96 92 754

[51] Int. Cl.[7] ............................................. B23C 3/12
[52] U.S. Cl. .................... 409/131; 29/33 A; 409/293; 451/5
[58] Field of Search ................. 29/33 A; 409/131, 409/132, 138, 139, 300, 293, 297; 451/28, 5, 21, 57; 901/41; 700/139

[56] References Cited

U.S. PATENT DOCUMENTS

| 3,695,771 | 10/1972 | Barbos ................. 409/138 UYR |
| 3,976,382 | 8/1976 | Wesby ................. 356/37 |
| 4,864,777 | 9/1989 | McLaughlin et al. ................. 451/5 |
| 4,894,597 | 1/1990 | Ohtomi ................. 901/41 |
| 5,280,171 | 1/1994 | Halter ................. 250/22 |
| 5,321,914 | 6/1994 | Husson ................. 409/138 UYR |
| 5,940,302 | 8/1999 | Pryor ................. 700/139 X |

FOREIGN PATENT DOCUMENTS 403321  8/1978  Sweden.
684656  11/1994  Switzerland.

Primary Examiner—William Briggs
Attorney, Agent, or Firm—Ostrolenk, Faber, Gerb & Soffen, LLP

[57] ABSTRACT

A deburrung method, in which a laser (3) is directed towards the edge of a workpiece (1) so that the position of a first surface (5) and a second surface (6) joining the first surface at an angle, can be deternined, after which extrapolation of a cutting curve (8) between the first surface (5) and the second surface (6) is performed and in that the burr (2) is removed along the cutting curve (8).

6 Claims, 1 Drawing Sheet

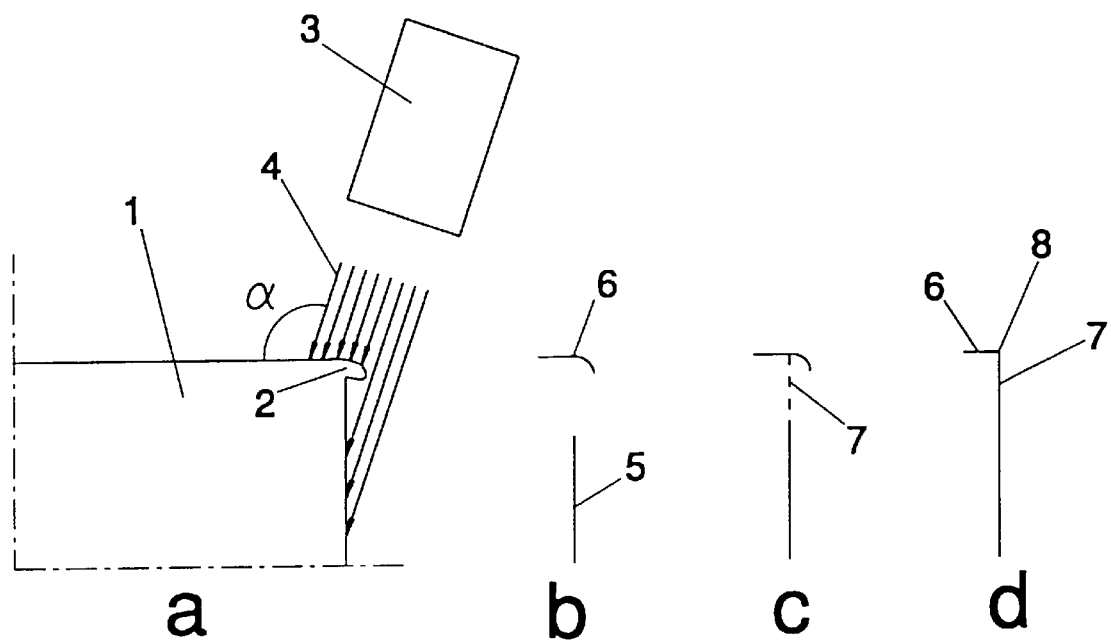
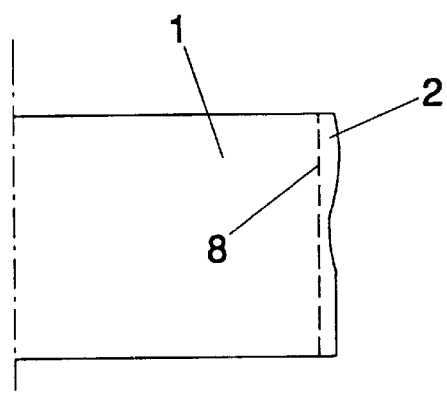 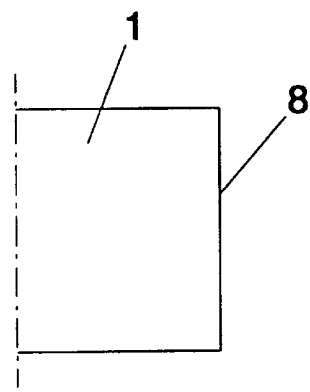
Fig 1
Fig 2
Fig 3

DEBURRING METHOD

TECHNICAL FIELD

The present invention relates to a deburring method, primarily in the workshop industry after a milling operation, for instance.

BACKGROUND ART

When a surface is machined by milling, casting components in metallic material or injection-moulding plastic components, for instance, burrs are formed at the edge of the surface, i.e. where the surface joins a second surface inclined in relation to said first surface. Previously burrs have been removed manually or by following the burr edge with a milling tool provided with a power sensor, the milling tool being pressed against the edge of the burr with a constant pressure in order to remove the burr. Performing manual deburring is a time-consuming operation and thus not cost efficient. Performing deburring with a milling tool provided with power sensor results either in the burrs remaining being too large, or in the edge being damaged, if the tolerance requirement is high.

OBJECT OF THE INVENTION

The object of the present invention is to provide a method for deburring machined workpieces that solves the problems entailed in previous deburring methods. Another object is to control a robot system for a fully automatic deburring operation.

Specific to the present invention is the method of taking a reading, calculating and extrapolating a cutting curve between two surfaces, and controlling a positioning head provided with a deburring tool in relation to the calculated cutting curve of the workpiece.

SUMMARY OF THE INVENTION

Using a laser of linear type, for instance, to scan an edge provided with burrs, an image is obtained which represents the defining line of a first surface and the defining line of a second surface. In view of the extension of the burr over the cutting curve of the surfaces a discontinuity is obtained caused by the bundle of laser rays being shadowed in the image obtained. This discontinuity is eliminated through an extrapolation calculation of the shaded surface in the direction of the unshaded surface in the imagine, thereby giving the cutting curve. A deburring tool is then controlled to cut along the cutting curve.

BRIEF DESCRIPTION OF THE DRAWINGS

The invention will now be described in more detail with reference to the accompanying drawings.

FIG. 1a shows a laser-illuminated edge of a workpiece with burrs, before being deburred by the method according to the present invention.

FIG. 1b shows a laser-scanned image according to FIG. 1a.

FIG. 1c shows extrapolation to the cutting curve.

FIG. 1d shows the result of the extrapolation according to the invention.

FIG. 2 shows the edge with burrs, seen from above.

FIG. 3 shows the result after deburring according to the invention.

DESCRIPTION OF THE INVENTION

A burr 2 has been formed on the edge of a workpiece 1 after a milling operation, for instance, and must be removed. For this purpose a linear laser 3 is used in conjunction with a deburring tool. The laser 3 with its bundle of rays 4, illuminates the burr and thus the edge line of the workpiece through an angle a where a is chosen so that the laser illuminates the adjoining surfaces in suitable manner. The angle a is determined taking into consideration the size and extension of the burr. A suitable choice for the laser setting is for the laser 3 to be directed towards the edge line of a workpiece (1) with burrs through the angle $\alpha$ between the illumination direction and the burr-emanating second surface, where $90°<\alpha<180°$. After an evaluation, the result of the laser illumination produces an image, see FIG. 1b, defined by a first surface, the adjoining surface 5, and a second surface the burr surface 6. This laser image is determined in relation to the deburring tool as to position and appearance. The laser image then undergoes calculation to determine which of the two surfaces is deemed to be the burr surface 6, whereupon the other surface is consequently defined as the adjoining surface 5. After this calculation an extrapolation of the adjoining surface 5 is performed towards the burr surface 6, resulting in an extrapolation surface 7, see FIG. 1c. The extrapolation is performed up to the cutting curve 8 between the extrapolation surface 7 and the burr surface 6, see FIG. 1d.

A calculation has thus been performed where the cutting curve 8, see FIG. 2, is relative to the deburring tool regardless of the appearance of the burr 2 or the workpiece 1. For the sake of simplicity a burr has been shown on a workpiece with a flat burr surface at 90° to a flat adjoining surface, in which case the cutting curve will form a straight line in the embodiments shown. However, it is also possible to extrapolate a curved burr surface at an angle different from 90° to a curved adjoining surface, the position of which has been determined, after which deburring can be performed as described above. The accuracy of the position of the basic surfaces and the extrapolation of the adjoining surface are of great significance to the deburring result, as well as the control of the deburring tool towards the cutting curve.

Once the cutting curve 8 between the two surfaces is known, the tool for deburring the workpiece 1 is guided along the curve 8 which is illustrated as a straight line in the figures. FIG. 3 shows the result after deburring according to the invention.

What is claimed is:

1. A deburring method for removing a burr from a workpiece, comprising:

directing a laser toward an edge of the workpiece for determining the position of a first surface of the workpiece and the position of a second surface of the workpiece, wherein the first and second surfaces would intersect at an angle and where the burr is between the first and second surfaces;

extrapolating a cutting curve between the first and second surfaces and then removing the burr along the extrapolated cutting curve.

2. A deburring method for removing a burr from a workpiece, comprising directing a laser toward an edge of a work piece for directing the laser on a first surface of the workpiece and a second surface of the workpiece which would join the first surface at an angle, and wherein a burr to be removed is located between the first and second surfaces;

determining the position of the second surface together with the burr on it;

determining the position of the first surface without the burr;

then calculating the extension of the first surface toward the second surface and calculating a cutting curve between the first surface and the second surface and then removing the burr along the cutting curve.

3. The method of claim 2, wherein the position of the first surface is determined without the burr after the position of the second surface is determined together with the burr.

4. The method of claim 2, wherein calculating of the cutting curve comprises extrapolating the first surface in the direction of the second surface in order to determine the cutting curve.

5. The method of claim 2, wherein the laser is directed toward the edge line of a workpiece having burrs, where the laser is directed at an angle $\alpha$ between the illumination direction and the second surface from which the burr emanates wherein $90°<\alpha<180°$.

6. The method of claim 1, wherein the laser is directed toward the edge line of a workpiece having burrs, where the laser is directed at an angle $\alpha$ between the illumination direction and the second surface from which the burr emanates wherein $90°<\alpha<180°$.

* * * * *